(12) United States Patent
Jennings et al.

(10) Patent No.: US 8,191,131 B2
(45) Date of Patent: May 29, 2012

(54) OBSCURING AUTHENTICATION DATA OF REMOTE USER

(75) Inventors: Jeffrey Bart Jennings, Raleigh, NC (US); Kofi Kekessie, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1407 days.

(21) Appl. No.: 11/466,494

(22) Filed: Aug. 23, 2006

(65) Prior Publication Data

US 2008/0072304 A1 Mar. 20, 2008

(51) Int. Cl.
*G06F 9/00* (2006.01)
(52) U.S. Cl. ............ 726/11; 726/5; 726/6; 726/18; 726/21; 713/168; 713/170; 380/277; 380/286
(58) Field of Classification Search ............ 726/11, 726/28; 380/277; 713/168
See application file for complete search history.

(56) References Cited

U.S. PATENT DOCUMENTS

| | | | |
|---|---|---|---|
| 6,463,474 B1 | 10/2002 | Fuh et al. | |
| 6,661,896 B1* | 12/2003 | Barnett | 380/262 |
| 6,668,325 B1 | 12/2003 | Collberg et al. | |
| 6,704,866 B1* | 3/2004 | Benayoun et al. | 713/151 |
| 6,782,473 B1* | 8/2004 | Park | 713/160 |
| 7,043,640 B2* | 5/2006 | Pritchard et al. | 713/184 |
| 7,051,206 B1* | 5/2006 | Giest et al. | 713/176 |
| 7,127,612 B1* | 10/2006 | Ishibashi | 713/169 |
| 7,181,762 B2* | 2/2007 | Jerdonek | 726/2 |
| 7,324,647 B1* | 1/2008 | Elliott | 380/278 |
| 7,367,050 B2* | 4/2008 | Mitsuoka et al. | 726/2 |
| 7,386,720 B2* | 6/2008 | Sandhu et al. | 713/155 |
| 7,391,865 B2* | 6/2008 | Orsini et al. | 380/201 |
| 7,430,671 B2* | 9/2008 | Graves et al. | 713/193 |
| 7,433,362 B2* | 10/2008 | Mallya et al. | 370/408 |
| 7,447,775 B1* | 11/2008 | Zhu et al. | 709/226 |
| 7,502,936 B2* | 3/2009 | Weatherford et al. | 713/184 |
| 2002/0095569 A1 | 7/2002 | Jerdonek | |
| 2003/0016655 A1 | 1/2003 | Gwon | |
| 2003/0065919 A1 | 4/2003 | Albert et al. | |
| 2003/0101339 A1* | 5/2003 | Bianchini et al. | 713/153 |
| 2003/0105872 A1 | 6/2003 | Han et al. | |
| 2003/0126230 A1 | 7/2003 | Donatelli et al. | |
| 2003/0134615 A1 | 7/2003 | Takeuchi | |
| 2003/0154306 A1* | 8/2003 | Perry | 709/245 |

(Continued)

OTHER PUBLICATIONS

Schneier, Applied Cryptography, 1996, Katherine Schowalter, Section 3.6—pp. 70-71, Section 8.3—pp. 176-177.*

*Primary Examiner* — Nathan Flynn
*Assistant Examiner* — Viral Lakhia
(74) *Attorney, Agent, or Firm* — Brandon C. Kennedy; Cynthia G. Seal; Biggers & Ohanian, LLP

(57) ABSTRACT

A system and method in which authentication data, such as a password, which is sent to a server/firewall as part of an authentication request, for example a logon request, is received at the server/firewall in a plurality of messages at a plurality of logical ports from the user, thus improving protection against replay attacks. In one embodiment, a plurality of user authentication data parts is obtained from a remote user device as part of an authentication request, the plurality of user authentication data parts is assembled into user authentication data; the authenticity of the authentication request is checked using the user authentication data; and communication with the remote user device is enabled if the authentication request data is determined to be authentic.

9 Claims, 4 Drawing Sheets

U.S. PATENT DOCUMENTS

| | | | |
|---|---|---|---|
| 2003/0169713 A1 | 9/2003 | Luo | |
| 2003/0233542 A1 | 12/2003 | Benaloh | |
| 2004/0030765 A1 | 2/2004 | Zilbershtein et al. | |
| 2004/0049687 A1* | 3/2004 | Orsini et al. | 713/189 |
| 2004/0049702 A1* | 3/2004 | Subramaniam et al. | 713/201 |
| 2004/0057582 A1* | 3/2004 | Fukuda | 380/277 |
| 2004/0128540 A1 | 7/2004 | Roskind | |
| 2004/0128545 A1 | 7/2004 | Chakravarty | |
| 2004/0168071 A1* | 8/2004 | Silverbrook | 713/189 |
| 2005/0076234 A1* | 4/2005 | Krtolica et al. | 713/201 |
| 2005/0149762 A1* | 7/2005 | Smith et al. | 713/202 |
| 2005/0210126 A1* | 9/2005 | Friedman | 709/220 |
| 2005/0278533 A1* | 12/2005 | Mayer | 713/170 |
| 2006/0168654 A1 | 7/2006 | Jennings et al. | |
| 2007/0076878 A1* | 4/2007 | Kuang | 380/255 |
| 2007/0150743 A1* | 6/2007 | Weatherford et al. | 713/184 |
| 2007/0192586 A1* | 8/2007 | McNeely | 713/153 |
| 2008/0151740 A1* | 6/2008 | Atzmon et al. | 369/275.2 |

\* cited by examiner

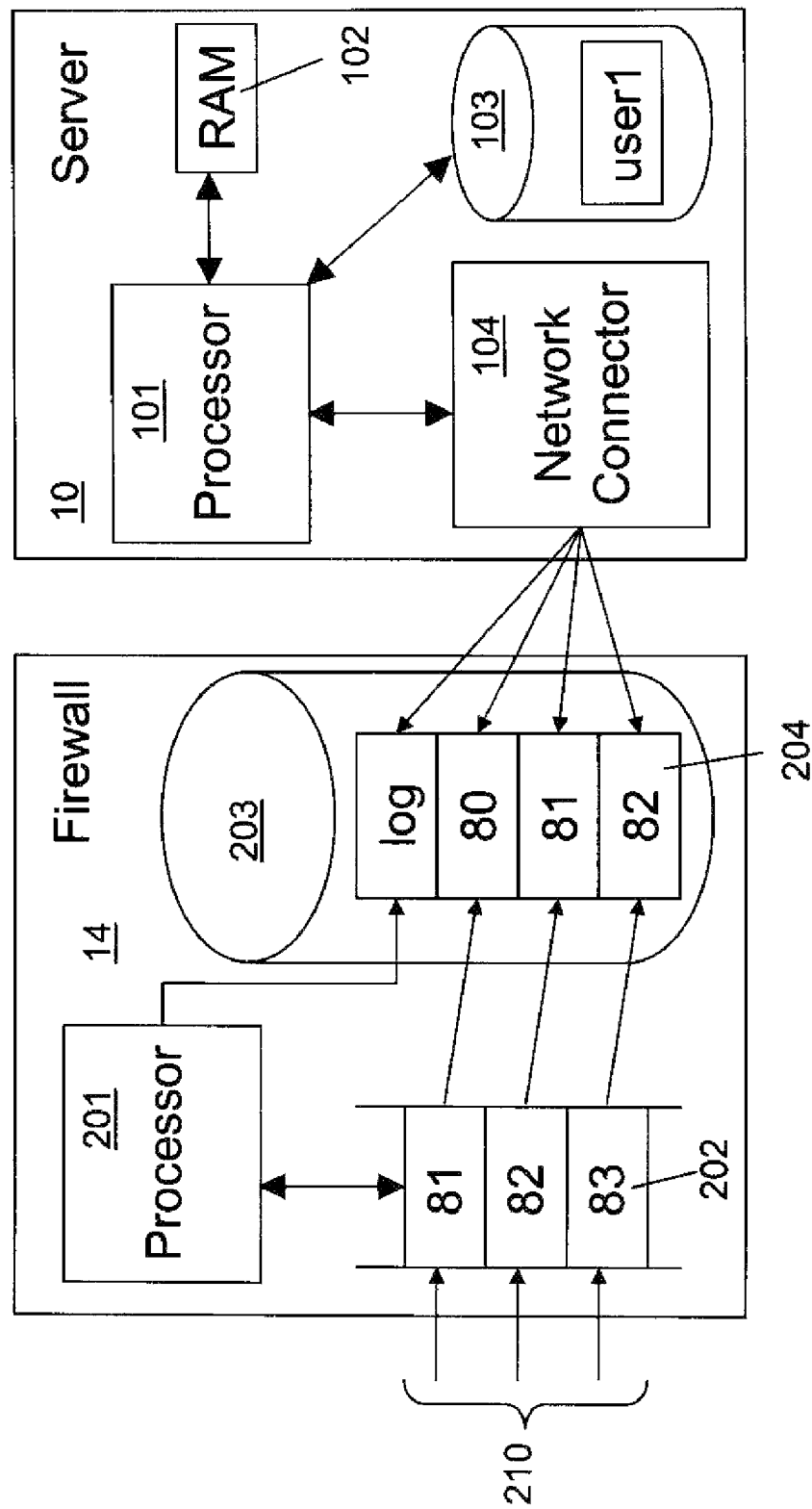

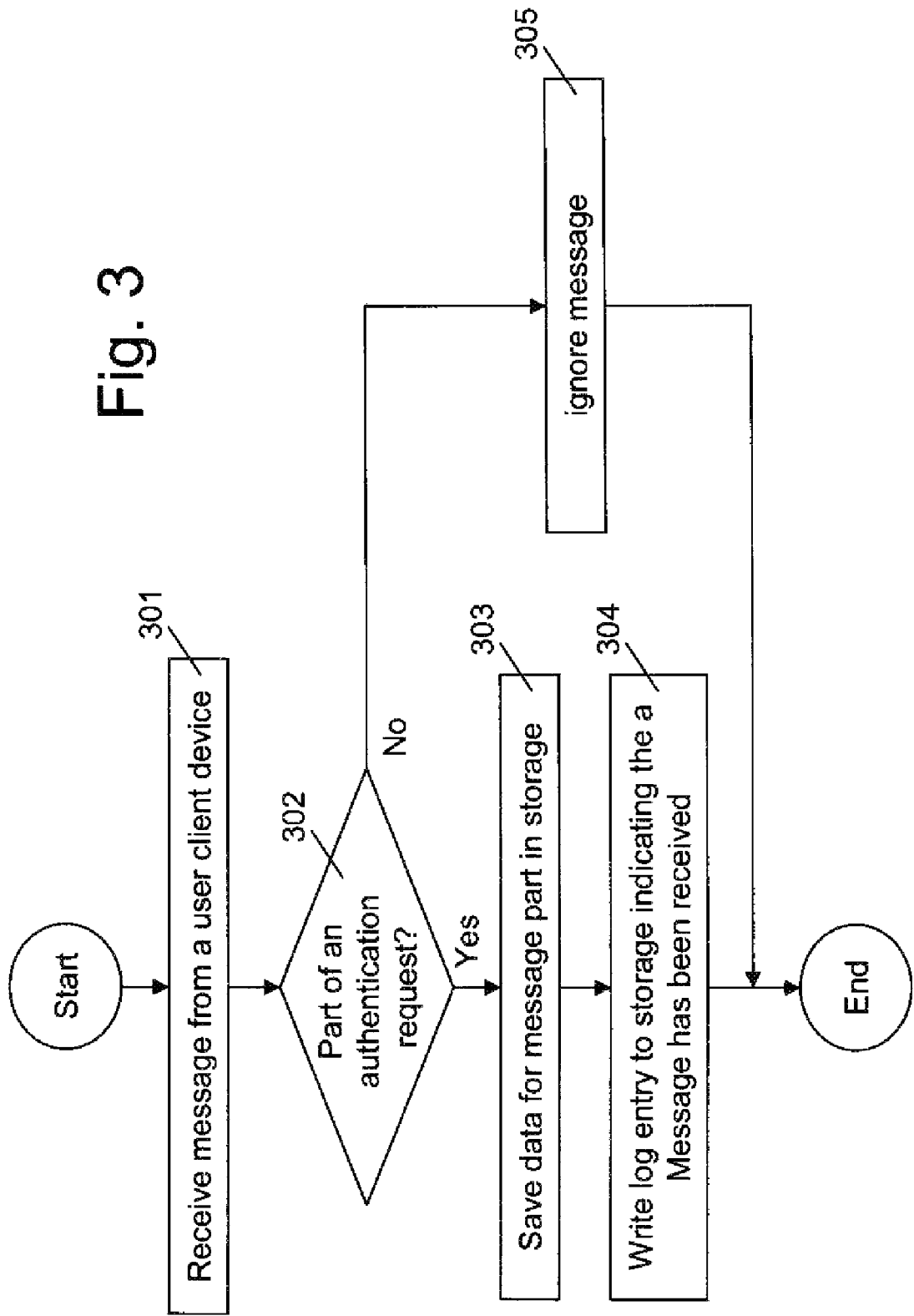

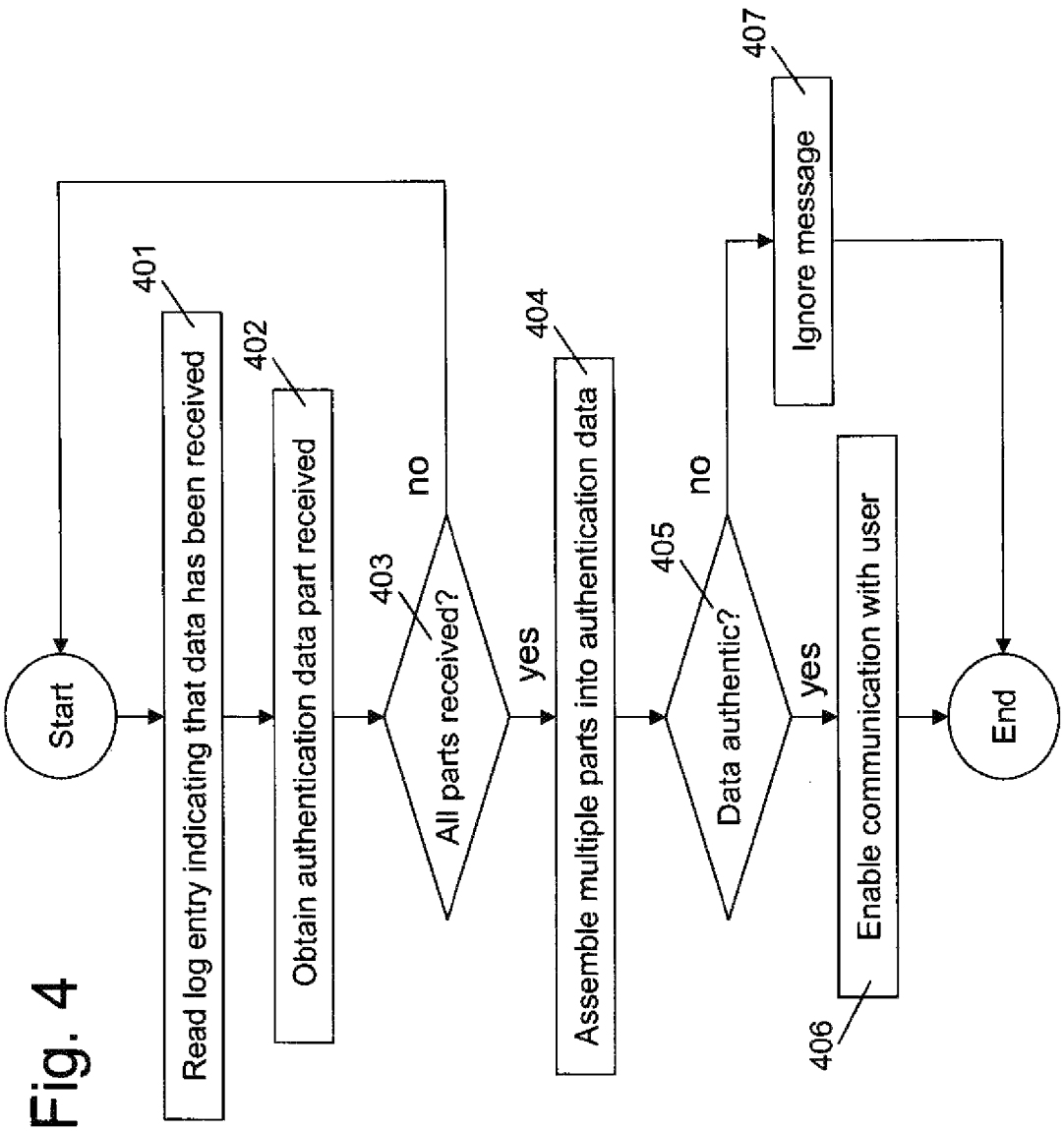

OBSCURING AUTHENTICATION DATA OF REMOTE USER

BACKGROUND OF THE INVENTION

1. Statement of the Technical Field

The present invention relates to network communication security and more particularly to a method and system for obscuring authentication data sent which is sent from a client to a server as part of an authentication request.

2. Description of the Related Art

With the proliferation of public access communication networks such as the Internet, security and integrity of data is a concern that permeates society. Related to this concern is the availability of server resources and the need to provide availability and access to potentially sensitive data in the face of malicious unauthorized access attempts, i.e., hackers, as well as attempts to destroy data and computing resources, i.e., viruses and worms. These computer hackers and viruses and worms are constantly probing and analyzing networks, servers and other computing resources for vulnerabilities that can be exploited.

Many schemes for protecting data and unauthorized access to computing resources exist, ranging from general password protection to more sophisticated firewall arrangements. As typically occurs in Internet communications, when a client computer seeks to access a web server, the request in the form of an Internet Protocol ("IP") packet is routed through a series of networks. OSI Layers, such as the Transmission Control Protocol ("TCP") layer, use a logical port number assigned to each message so that the recipient device can determine the type of service being is requested/provided. These logical ports are therefore reference numbers used to define a service. Logical port numbers are straight unsigned integer values which range up to a value of 65535. Some logical ports are assigned, some reserved and many unassigned which may be utilized by application programs. For instance, the hypertext transfer protocol ("HTTP") uses port 80 by default to provide web browsing services.

In order to allow services like internet web browsing to be used, the supporting logical ports, like port 80, are typically left unblocked by firewalls so that the corresponding data, for example a request for information, can be received by the web server. Once the data has passed through the firewall, the web server typically blindly accepts the data, processes it and sends the result back to the originating client computer. Such can even be the case where a web server receives a request and replies by requesting a password and/or ID. Further, for example, a response to a request for a password is received as a single message, this making it possible for the message to be recorded and replayed in order to mount a replay attack.

These arrangements make the servers vulnerable to the above-described attacks and further, disadvantageously, require a significant amount of administration by administrators in order to constantly update firewall rule sets after the attacks have been made. It is therefore desirable to have a system and method which allows client computers to communicate with servers via a firewall in which the firewall does not need to have certain ports allowed by default, i.e. the firewall apparently blocks all incoming traffic regardless of port number. It is further desirable to have a system and method which provides greater protection against a replay attack in which a message comprising, for example a password, is recorded and re-sent to a server.

SUMMARY OF THE INVENTION

The present invention provides a system and method in which authentication data, such as a password, which is sent to a server/firewall as part of an authentication request, for example a logon request, is received at the server/firewall in a plurality of messages at a plurality of logical ports from the user, thus improving protection against replay attacks.

Accordingly, according to a first aspect the present invention provides a method comprising: obtaining a plurality of user authentication data parts from a remote user device as part of an authentication request, wherein the user authentication data parts were received in a plurality of messages, at least two of the plurality of messages message having been received at different logical ports; assembling the plurality of user authentication data parts into user authentication data; checking the authenticity of the authentication request using the user authentication data; and enabling communication with the remote user device if the authentication request data is determined to be authentic.

For example, the authenticity of the user authentication data received from the remote user is checked by seeing if it matches a stored copy of the user authentication data. This check may be performed with either non-encrypted or encrypted forms of the data which, as a result, may require either encrypting/decrypting depending on the form in which it was received/stored.

Preferably a firewall receives the messages comprising user authentication data parts and provides details of them to a server for processing. This isolates the server from the network. For example the firewall may provide a message to the server by writing details of the message, including the user authentication data part included in the message, to a location in storage, such as a log, for the server to read. The firewall may further notify the server when such details have been written. In this case the server receives, from the firewall, an indication that a message has been received and that the user authentication data part which it comprises has been written to a location in storage.

The server then reads the user authentication data part from the location in storage. This process is then repeated until all parts of the user authentication data have been received.

Assembling the user authentication data parts may be based on ordering the parts in the order in which they were sent. However, optionally a value is included in each message and which is associated with an authentication data part. The value is then used to determine an ordering of the plurality of user authentication data parts, for example the value can be a sequence number and as a result the parts can be sent in any order. Further if at least one of the messages comprising a user authentication data part includes an identifier which identifies the user device, the identifier can be used, for example, to decide a basis for using the values to determine an order for the user authentication data parts. This enables a set of values from one device to result in a ordering different from the same set of values from another device.

Optionally a set of logical ports is predefined and the checking of the authenticity of the authentication request further requires that at least one message comprising a user authentication data part was received at each of the logical ports in the set. Further, optionally, an identifier which identifies the user device and which was received with at least one of the messages comprising a user authentication data part, is used to determine the set of logical ports, such the different user devices must use different sets of logical ports in order to be considered authentic.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 2 is a block diagram of a firewall and server in which the preferred embodiment of the present invention could be advantageously applied;

FIG. 3 is a flow chart of a method of processing message data received in multiple parts by a firewall; and FIG. 4 is a flow chart of a method of processing message data received in multiple parts by a server.

DETAILED DESCRIPTION OF THE PREFERRED EMBODIMENTS

Figure 1:
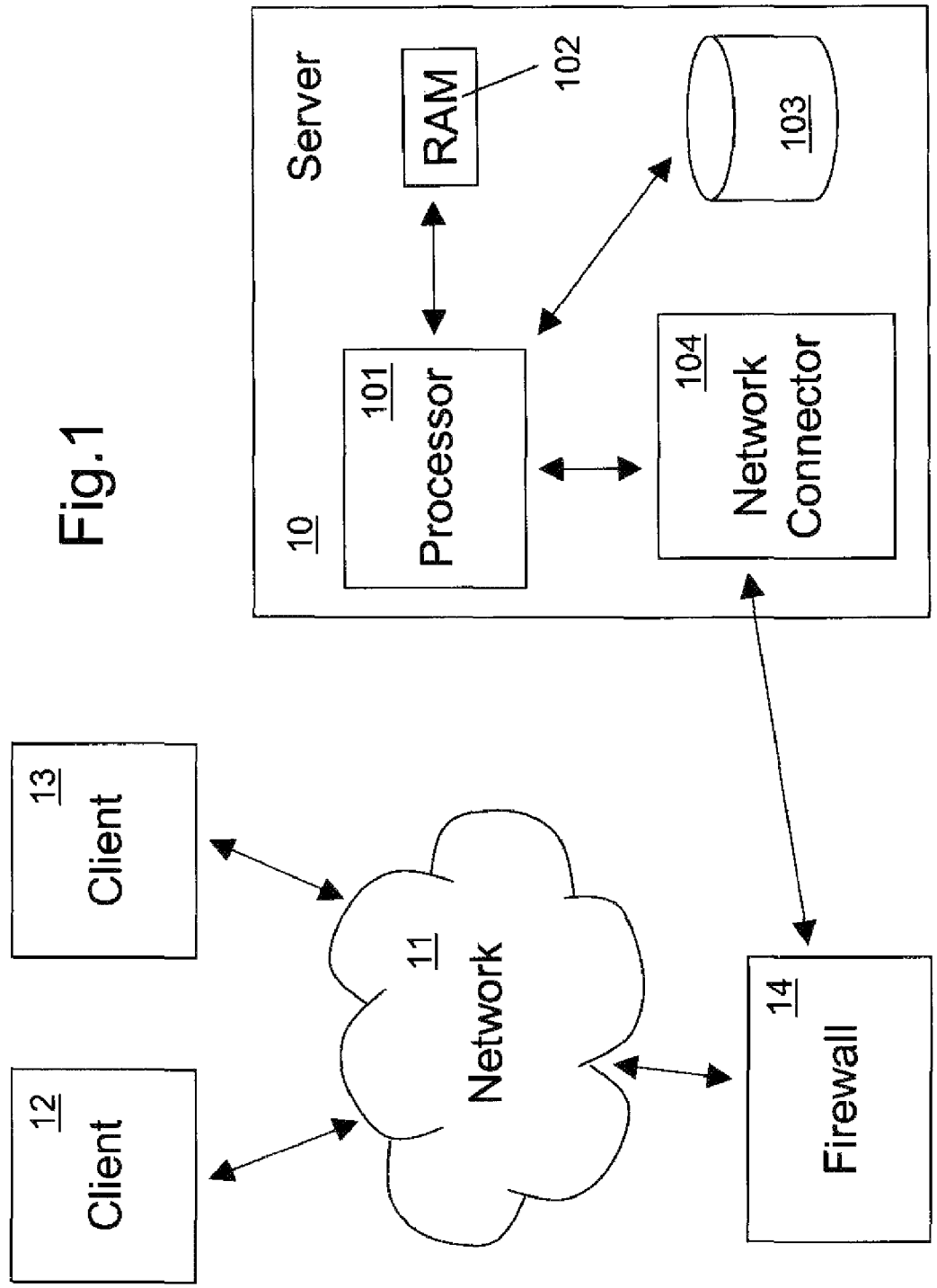
FIG. 1 is a block diagram of an example data processing environment in which the preferred embodiment of the present invention could be advantageously applied.

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

Referring to the drawing figures in which like reference designators refer to like elements there is shown in FIG. 1 a block diagram of an example data processing environment in which the preferred embodiment of the present invention could be advantageously applied. In FIG. 1, a server 10 is connected to a network 11 through a firewall 14. Also connected to the network are clients 12 and 13 which can communicate with server 10 over network 11 and through firewall 14.

Network 11 can be any computer network capable of transporting data between client computer 12/13 and firewall 14. For example a typically network will provide many different routes, via many different routers, from a client to a server. As used herein, the term "data" includes all forms of digital communication including but not limited to alpha-numeric information, audio, video, and any other form of encoded or encrypted information.

Client computer 12 and 13 can be any computing device capable of requesting information from a server, such as may be provided by web browsing software. For example, client computer 12 can be a desktop or laptop computer, a personal digital assistant ("PDA"), a mobile phone, and the like.

Server 10 comprises a one or more processors 101 for executing programs that control the operation of the server 10, a RAM volatile memory element 102, a non-volatile memory 103, and a network connector 104 for use in communicating with firewall 14. Firewall 14 and clients 12 and 13 comprise similar components to those of server 10 but these are not shown. Note that in other environments server 10 and firewall 14 may be combined into a single unit.

For example of server 10 have program instruction code in non-volatile memory 103 to carry out appropriate methods of the preferred embodiment of the present invention, execution of such program instruction code being performed as one or more sub-processes by one or more processors 101 and involving use to RAM volatile memory element 102. Of note, it is presumed that a person of ordinary skill in the art can write program instruction code using a known computing software language to implement the preferred embodiment of the present invention.

FIG. 2 is a block diagram of the server 10 and firewall 14 of figure with additional information which will be used to describe some aspects of the preferred embodiment of the present invention. Firewall 14 comprises a processor 201, a plurality of logical ports 202 for receiving data from the network and non-volatile data storage 203.

In operation a user device transmits a plurality of logical ports to server 10, splits authentication data, for example an encrypted password, of an authentication request into multiple parts, and sends various messages 210, each containing a part of the authentication data, to each of the plurality of logical ports. Optionally, different network routes are defined for one or more of the logical ports such that the one or more messages are sent over different network routes. The firewall 14 then receives these messages 210 at a plurality of logical ports 202, each message being received separately, potentially at different times, and optionally via different network routes. Each message comprises an indication that the message comprises a part of authentication data for an authentication request and two values. The values indicate how many authentication data parts make up the authentication data and the relative location of the authentication data part in the message in the authentication data. Optionally the values are included as part of the authentication data, for example, as part of an encrypted password. On receipt of a message, firewall 14 notices that the message is part of an authentication request and as a result saves details of the message and a log entry to non-volatile storage. At this point the firewall makes no response to the requestor, so the target authentication server does not even seem to exist. The details of the message include the message data and the log entry provides details of where the message part is held in non-volatile storage 203, and further serves as an indication to a server that message data for an authentication request has been received. Optionally the message details further comprise details of the logical port at which the message was received. Alternatively the log entry includes the message details.

The log entry is subsequently read by server 10 to obtain the message data, and deleted. The server identifies the message data as part of user authentication data received from a user as part of a user authentication request. The server then accumulates, over a period of time, all parts of the user authentication data by reading and using the associated log entries written by the firewall as and when the messages in which they are contained are received. When all parts of the user authentication data have been obtained, server 10 assembles the parts into the received user authentication data and then checks its authenticity by comparing it with a stored copy of the authentication data for the user which is held by the server in non-volatile storage 103 in, for example, in a secure database. Note that the received authentication data and/or the stored authentication data may be in an encrypted form and may require encrypting/decrypting for comparison in either encrypted or non-encrypted form, as required. If the received user authentication data matches the stored authentication data, the received authentication data is found to be authentic and the authentication request is accepted. As a result the firewall 14 is instructed to enable communication with the device from which the authentication request was received by allocating a logical port for use to communicate with the user device. If the received user authentication data does not match the stored authentication data the authentication request is ignored. This instruction to the firewall may be a dynamic reconfiguration of its rule set to allow communication with a specified host after which server 10 will complete the authentication of the host.

Note that the logical ports at which the authentication data parts received are defined by an administrator of the firewall. For example, specific ports can be allocated for receiving messages comprising user authentication requests and user authentication data. In this case messages to the allocated ports which do not comprise user authentication requests or user authentication data can be rejected by the firewall.

Further, optionally the authenticity of received authentication data can depend on the logical ports at which the messages comprising the authentication data parts were received. For example, a set of logical ports can be defined and the authentication data is only considered to be authentic if it matches the copy of the authentication data held by the server and if at least one message comprising an authentication data part of the authentication data, was received at each of the logical ports in the defined set. Optionally the defined set is selected based on the device/user making the authentication request, such that different devices/users need to use different sets of ports for their authentication request to be considered authentic.

Accordingly, in the preferred embodiment of the present invention the user authentication data is received in a plurality of parts at a plurality of logical ports. This protects against replay attacks where user authentication data sent to a server is recorded, for example, by a computer hacker, and then resent to the server in order to falsely authenticate as the user. This is because it is necessary to record all parts of the message, which are not easily identified, in order to be successful. Further even better protection is received if different parts of the user authentication data are sent over different network routes, for example via different network routers. This is because the computer hacker would need to record message data from each different route in order to be successful.

FIG. 3 is a flow chart of a method for processing user authentication data received at a logical port, and in multiple parts, by a firewall, for example firewall 14 of FIGS. 1 and 2, according to the preferred embodiment of the present invention. At step 301 a message, comprising a part of the user authentication data, is received by a firewall at a logical port configured for receiving messages which are part of an authentication request. The firewall is configured to recognize messages which are part of an authentication request by reading a data in the message which indicates this, and as a result, at step 302, the message it checked to see if is part of an authentication request. If the message is part of an authentication request details of the message, including the authentication data part, are saved in storage accessible to the firewall at step 303, and an entry is written to a log in storage accessible to the firewall at step 304. The log entry serves an indication to a server that a message has been received and details of it have been written to storage. However, if the message is not part of an authentication request the message is ignored at step 305. These steps are repeated for all messages which the firewall receives at a port configured for receiving messages which are part of an authentication request are received. This ensures that all messages which are part of the request are processed in the same way. Note that whilst the firewall 14 recognizes that the message is part of an authentication request, it is not capable of recognizing the contents of the authentication data received with the message.

Note that alternatively, for example, steps 302 and 303 can be combined such that the log entry written comprises the message details. Further note that the storage to which the authentication data part and log entry are written is also accessible to a server which will process the message, for example server 10 of FIGS. 1 and 2.

FIG. 4 is a flow chart of a method of processing user authentication data received in multiple parts by a server, for example server 10 of FIGS. 1 and 2, according to the preferred embodiment of the present invention. At step 401 the server reads the log entry written at step 303 of FIG. 3 which indicates that data has been received. At step 402 the server uses details from the log entry to obtain the message data and identify it as a part of a user's authentication data. At step 403 the server checks to see if all parts of the user authentication data have been obtained and if not re-starts the method. Once all parts of the authentication data has been obtained, at step 404, the user authentication data parts are assembled into the user authentication data. At step 405 the authenticity of the user authentication data is checked by comparing it with a copy of the authentication data for the user which is held by the server in storage. For example if the user authentication data comprises an encrypted password from the user, the server checks this against the correct encryption of the user's password obtained from a secure database accessible to the server. If the user authentication data is valid and passes the check, at step 406 communication from the server to the device in use by the user is enabled by instructing the firewall to allocate/open a port for the client device to communicate with the server. However, if the user authentication data is invalid and fails the check, at step 407 the authentication data is ignored.

Note that at step 401 the server reads the log entry written at step 303. In the preferred embodiment of the present invention, server 10 monitors the log, for example by examining it periodically, in order to become aware of new log entries. In an alternative embodiment the firewall 14 notifies server 10 that one or more new log entries exist, for example by notifying the server after a pre-determined number of messages have been received or after a pre-determined period of time has elapsed.

Further note that different algorithms may be used to assemble the multiple parts into the authentication data and further this algorithm may be private between client and server for added security. For example in one algorithm each part includes a sequence number which indicates its position, relative to other parts, in the authentication data. For example in another algorithm each part could be a different length and the server decides a sequence number based on the length. For example, in yet another algorithm, parts may be sent which do not include authentication data. A skilled person will realize that many other algorithms and combination of these and other algorithms are possible.

Note that in an alternative embodiment, server 10 can carry out some or all of the method steps of FIG. 3, and firewall 14 can carry out some or all of the method steps of FIG. 3. For example firewall 14 could inspect the message data to become aware that the user authentication data is being received in a plurality of parts and only write a single log entry when all parts have been received.

Further note that in an alternative embodiment as user authentication request is ignored if messages comprising the authentication data part of the authentication data are not received at a required set of ports. Such processing may be performed by the firewall or the server. For example if the server performs this processing, with reference to FIG. 4, step 404 can include the step of determining a set of logical ports to be associated with the authentication request, and step 405 can include the step of determining that the request is authentic if a message, comprising an authentication data part of the authentication data, was received at each of the logical ports in the determined set. For example, the determined set of logical ports can be the same for all authentication requests, or different for different for different authentication requests. For example, if different sets are used for different requests, the source of the request (device or user) may be used to determine the set to be used. Not that a skilled person will realize that these additional steps could be added at different points in the method of FIG. 4.

Note that the invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

What is claimed is:

1. A method comprising:
   obtaining a plurality of user authentication data parts from a remote user device as part of an authentication request, wherein the user authentication data parts were received in a plurality of messages, at least two of the plurality of messages having been received at different logical ports of a firewall;
   assembling the plurality of user authentication data parts into user authentication data;
   checking the authenticity of the authentication request using the user authentication data; and
   enabling communication with the remote user device if the authentication request data is determined to be authentic.

2. The method of claim 1 further comprising:
   receiving, for each message, an indication that the message has been received and that the part of the user authentication data which it comprises has been written to a location in storage,
   wherein obtaining the plurality of user authentication data parts comprises reading each of the user authentication data parts from the location in storage.

3. The method of claim 1 wherein the step of assembling the plurality of user authentication data parts comprises:
   obtaining, for each of the plurality of authentication data parts, an associated value;
   using the values associated with each of the plurality of authentication data parts to determine how to assemble the authentication data parts into the authentication data.

4. The method of claim 3 wherein at least one of the plurality of messages includes an identifier which identifies the user device and the step of using the values to determine how to assemble the authentication data parts into the authentication data further uses the identifier to determine the order.

5. The method of claim 1 wherein the set of logical ports is predefined and the step of checking the authenticity of the authentication request further comprises:
   checking that a message part was received at each of the set of logical ports.

6. The method of claim 1 wherein at least one of the plurality of messages includes an identifier which identifies the user device and a plurality of sets of logical ports are predefined and the step of checking the authenticity of the authentication request further comprises:
   using the identifier to select one of the plurality of sets of logical ports; and
   checking that a message part was received at each of the selected set of logical ports.

7. A method comprising:
   receiving a plurality of messages from a user device at a plurality of logical ports of a firewall;
   determining each message comprises a part of an authentication request from the user device,
   providing each of the plurality of message to a data processing host for processing as part of an authentication request.

8. The method of the claim 7 further comprising the step:
   responsive to determining a message is not part of an authentication request, rejecting the message.

9. A computer program product comprising:
   a computer readable transmission medium; and
   computer program instructions stored on the computer readable transmission medium that, when executed, cause a computer to carry out the steps of:
   obtaining a plurality of user authentication data parts from a remote user device as part of an authentication request, wherein the user authentication data parts were received in a plurality of messages, at least two of the plurality of messages having been received at different logical ports of a firewall;
   assembling the plurality of user authentication data parts into user authentication data;
   checking the authenticity of the authentication request using the user authentication data; and
   enabling communication with the remote user device if the authentication request data is determined to be authentic.

* * * * *